United States Patent [19]
Imakoshi et al.

[11] Patent Number: 4,516,179
[45] Date of Patent: May 7, 1985

[54] MAGNETIC TRANSDUCER HEAD UTILIZING MAGNETORESISTANCE EFFECT

[75] Inventors: Shigeyoshi Imakoshi, Atsugi; Yutaka Soda, Ebina; Hiroyuki Uchida, Atsugi; Junkichi Sugita, Ebina; Hiroshi Takino, Kodaira; Tetsuo Sekiya; Hideo Suyama, both of Yokohama, all of Japan

[73] Assignee: Sony Corporation, Tokyo, Japan

[21] Appl. No.: 408,025

[22] Filed: Aug. 13, 1982

[30] Foreign Application Priority Data

Aug. 17, 1981 [JP] Japan .................... 56-128337

[51] Int. Cl.$^3$ ............................................. G11B 5/12
[52] U.S. Cl. .................................. 360/113; 324/252; 338/32 R
[58] Field of Search ................ 360/113, 125, 126; 338/32 R; 324/252

[56] References Cited

U.S. PATENT DOCUMENTS 3,860,965  1/1975  Voegeli ......................... 360/113
3,921,217  11/1975  Thomposon ................... 360/113

FOREIGN PATENT DOCUMENTS 2921350   11/1979  Fed. Rep. of Germany ...... 360/113
52-58515   5/1977  Japan ............................ 360/113
57-109121  7/1982  Japan ............................ 360/113
57-24017   8/1982  Japan ............................ 360/113

Primary Examiner—Stuart N. Hecker
Assistant Examiner—Alfonso Garciä
Attorney, Agent, or Firm—Hill, Van Santen, Steadman & Simpson

[57] ABSTRACT

A magnetic transducer head utilizing magnetoresistance effect is disclosed which includes a thin film magnetoresistance effect element held between, first and second substrates, at least one of the first and second substrates being formed of an electrically conductive material, and a biasing means for the magnetoresistance effect element to satisfy a potential relation $V_{MR} - V_S \leq 0.2$ volt, wherein $V_{MR}$ is a potential of the magnetoresistance effect element, and $V_S$ is a potential of the conductive substrate.

5 Claims, 14 Drawing Figures

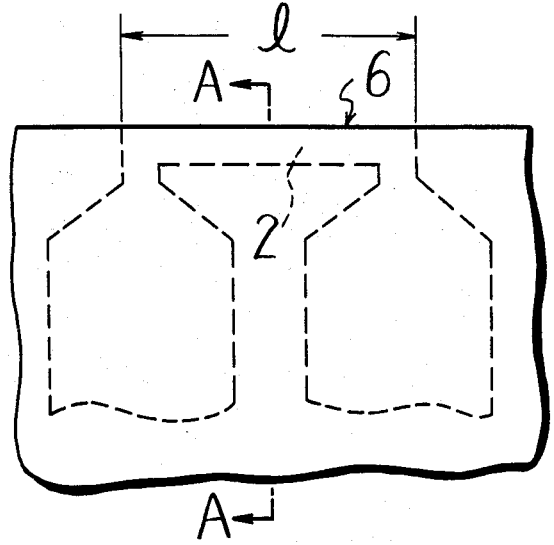
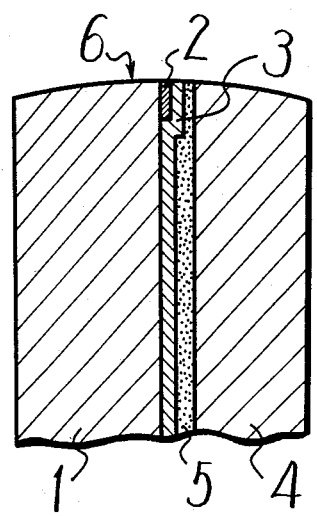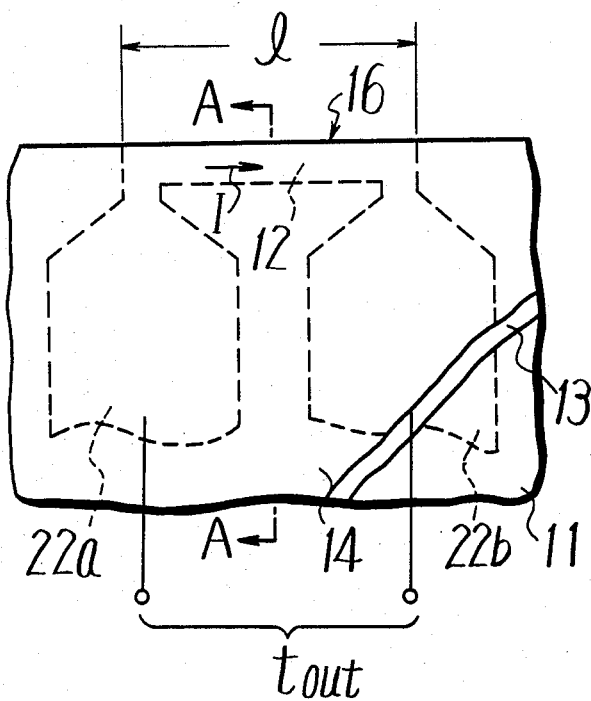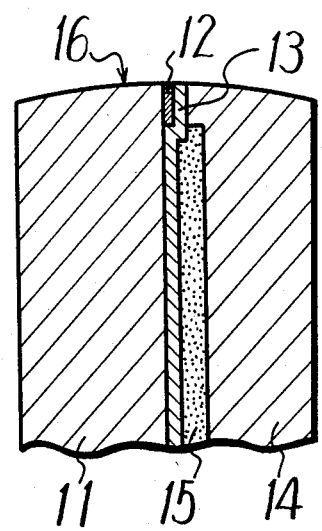

MAGNETIC TRANSDUCER HEAD UTILIZING MAGNETORESISTANCE EFFECT

BACKGROUND OF THE INVENTION

1. Field of the Invention

This invention relates generally to a magnetic transducer head and more particularly relates to a magnetic transducer head utilizing magnetoresistance effect.

2. Description of the Prior Art

A conventional magnetic transducer head utilizing magnetoresistance (hereinafter, simply called MR) effect is constructed in general as, for example, shown in FIGS. 1 and 2. That is, a non-magnetic insulating substrate 1 made of, for example, sapphire is formed thereon with a MR element 2 made of a magnetic thin film having a MR effect such as Ni-Fe system alloy, Ni - Co system alloy and so forth, on which a protecting layer 3 made of, for example, $SiO_2$ is formed. A non-magnetic insulating substrate 4 likewise made of, for example, sapphire is bonded on the protective layer 3 through adhesive agent 5 so as to interpose the MR element 2 between the substrates 1 and 4. The thin film MR element 2 is formed for its one end surface to face a contacting surface 6 with a magnetic recording medium (not shown). The thickness thereof is selected to be about several hundreds Å, and the length l thereof corresponding to the track width of the magnetic recording medium is selected in a range from several tens to several hundreds μm. The direction to which the magnetic recording medium is moved relatively to this MR effect type magnetic transducer head is substantially coincident to the film thickness direction of the end surface of the thin film MR element 2 facing to the contacting surface 6 with the magnetic recording medium.

The playback magnetic head of such MR effect type can normally provide higher sensitivity in the reproduction of a narrow track, a short wavelength and at an ultra-slow speed playback than an ordinary playback magnetic head of electromagnetic induction type.

However, such MR effect type magnetic transducer head previously proposed may sometimes be eroded if the thin film MR element 2 comes into contact with a human body. For instance, the thin film MR element of, for example, 5 μm wide is cut off even though the human body comes into contact therewith for about 1 to 10 seconds. The reason why the thin film MR element is eroded is that sweat streamed from the human body acts as electrolyte for the thin film MR element and an electrostatically induced voltage generated in the human body is applied thereto to cause current flowing through the sweat to the MR element to electrolyze the latter. The erosion of the MR element as described above occurs when the following three conditions (i) to (iii) are satisfied at the same time.

(i) The MR effect type magnetic transducer head is grounded through a low impedance (for example, the impedance is about less than 10 KΩ).

(ii) The human body comes into contact with the MR effect type magnetic transducer head under the state that the human body is electrically floated.

(iii) The human body has electrostatically induced voltage by a power source line.

In other words, when the human body is floated electrically, generally the human body is electrostatically induced by the power source line to have an induction potential (about ±20 V). Whereas, when the MR effect type magnetic transducer head is grounded through a low impedance, a potential difference is produced between the human body and the MR effect type magnetic transducer head. If under such state as described above the human body comes into contact with the MR effect element, current flows therethrough and hence it is electrolyzed and then cut off.

In order to prevent the MR effect element from being eroded by the contact of the human body as stated above, it may be considered that the occurrence of the electrolysis will be avoided if a part of the human body is grounded to allow the MR effect element and the human body to become equal in potential. But, even though the human body is grounded as seen in the above, there occurs such a case where the MR effect element is likely to be eroded.

OBJECTS AND SUMMARY OF THE INVENTION

It is an object of the present invention to provide an improved magnetic transducer head utilizing magnetoresistance effect.

It is another object of the present invention to provide a magnetic transducer head utilizing magnetoresistance effect having a superior reliability.

It is further object of the present invention to provide a magnetic transducer head utilizing magnetoresistance effect in which erosion of the magnetoresistance effect element is avoided even in contact with a human body.

According to an aspect of the invention, there is provided a magnetic transducer head utilizing magnetoresistance effect comprising:

- a thin film magnetoresistance effect element held between first and second substrates, at least one of said first and second substrates being formed of an electrically conductive material, and
- a biasing means for said magnetoresistance effect element to satisfy a potential relation $V_{MR}-V_S \leq 0.2$ volt, wherein $V_{MR}$ is a potential of said magnetoresistance effect element, and $V_S$ is a potential of said conductive substrate.

The other objects, features and advantages of the present invention will become apparent from the following description taken in conjunction with the accompanying drawings through which the like references designate the same elements and parts.

BRIEF DESCRIPTION OF THE DRAWINGS

FIG. 1 is an enlarged plan view of an example of a prior art magnetic transducer head utilizing magnetoresistance effect;

FIG. 2 is a cross-sectional view taken along a line A—A in FIG. 1;

FIG. 3 is an enlarged plan view of an embodiment of a magnetic transducer head utilizing magnetoresistance effect according to the present invention;

FIG. 4 is a cross-sectional view taken along a line A—A in FIG. 3;

DESCRIPTION OF THE PREFERRED EMBODIMENTS

Figure 5:
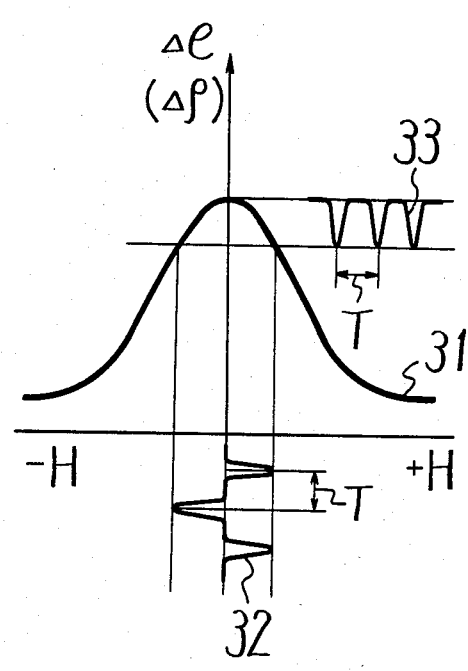
FIGS. 5 and 6 are graphs each being useful for explaining a biasing magnetic field applied to the magnetic transducer head.

The present invention will be described hereinbelow with reference to the attached drawings.

In accordance with this invention, when a human body comes into contact with a magnetic transducer head utilizing MR effect, the human body is substantially grounded at the same time. In addition, it was studied that even when the human body was grounded, under the state that in the operation mode of, for example, the magnetic transducer head, a potential exceeding 0.2 V with respect to the human body was applied to an MR effect element, such a current as to cause the electrolysis in the MR effect element was flowed to the MR effect element thereby causing the erosion of the MR effect element. Based on the above study, according to this invention, a predetermined biasing voltage is applied to the MR effect element, by which even when the human body comes into contact therewith in the operation mode of the magnetic transducer head under the state that the MR effect element is substantially applied with the aforementioned voltage, the occurrence of the erosion in the MR effect element can be avoided.

With reference to FIGS. 3 and 4, a first embodiment of this invention will be described. In this embodiment, a first substrate 11 is formed thereon with a thin film MR effect element 12 and an insulating layer 13 is formed on the MR effect element 12 to cover, for example, the whole surface of the substrate including the MR effect element 12. Moreover, although not shown, in some cases, a Co layer or the like is formed on the insulating layer 13 with a predetermined pattern to provide a magnetic field generating means for applying a biasing magnetic field to the MR effect element 12, which will be described later. Furthermore, in this case, though not shown, by way of an insulating layer formed so as to cover, for example, the whole surface of the insulating layer 13, a second substrate or protecting substrate 14 is bonded by adhesive agent 15 to the first substrate 11 so as to grip the MR effect element 12 therebetween.

Reference numeral 16 designates a contacting surface finished as in a mirror surface, which will contact with a magnetic recording medium (not shown). The MR effect element 12 is arranged so that its one side end surface faces the contacting surface 16 with the magnetic recording medium. In this case, the inner surface of the second substrate 14 is so formed as a suitably uneven surface that the area of the adhesive agent layer 15 facing to the contacting surface 16 with the magnetic recording medium is reduced as much as possible.

This invention takes advantage of the fact that when the human body or his finger comes into contact with the MR element 12 facing the contacting surface 16 with the magnetic recording medium, such finger is urged to come into contact with not only the thin film MR element 12 of extremely thin but also both of the first and second substrates 11 and 14 gripping therebetween the MR element 12 at the same time with large area. Therefore, in accordance with the present invention, at least either of the first and second substrates 11 and 14 is formed of a conductive substrate, by which at the same time when the finger comes into contact with the MR element 12, the human body is substantially grounded.

By way of example, the substrate 11 is formed of a non-magnetic and insulating sapphire substrate, on which the thin film MR element 12 of, for example, 500 Å thick made of Ni - Fe alloy, Ni - Co system alloy and the like and having MR effect is formed. As shown in FIG. 3, this MR element 12 is formed as, for example, a substantially straightline-shaped band pattern, from both ends of which extended rearward are terminal portions 22a and 22b for leading out output terminal $t_{out}$. Thus, as a whole, the MR element 12 is formed as a U-shape pattern. These terminal portions 22a and 22b can be made of material having high conductivity. Then, including these terminal portions 22a and 22b, and covering the thin film MR element 12, the insulating layer 13 of 5000 Å thick having good wear resistance is formed on the substrate 11 completely. The second protecting substrate 14 having resistivity $\rho$ of less than 100 $\Omega$.cm, for example, the substrate made of a nonmagnetic sintered complex of alumina and titanium carbide $Al_2O_3$ - TiC having resistivity of 1 $\Omega$.cm is bonded to the insulating layer 13 through the adhesive agent 15 so as to grip the thin film MR element 12 therebetween.

Figure 6:
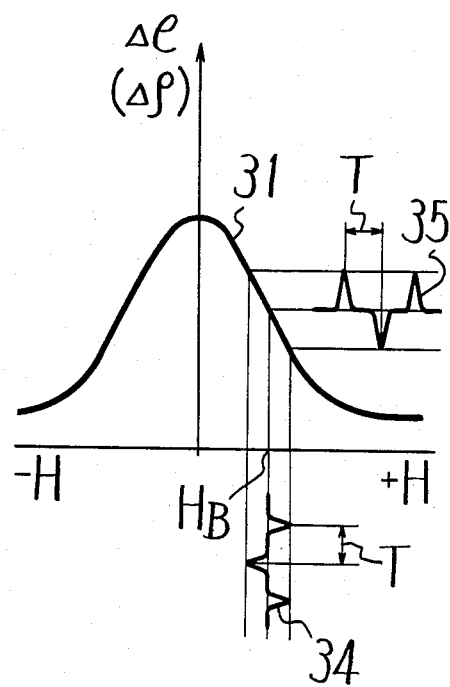

The MR element 12 is supplied with a current $\overline{I}$ which flows in its longitudinal direction. When a uniform magnetic field H perpendicular to the direction of the above current flow $\overline{I}$ and along the direction of the film surface of the MR element 12 is applied thereto, a resistance change $\Delta\rho$ of the MR element 12 for its applied magnetic field H, and accordingly an output $\Delta e$ thereof presents a characteristic shown by a curve 31 in FIG. 5, that is, a characteristic symmetrical to the magnetic field $\pm \overline{H}$. In this case, if under the state that no biasing magnetic field is applied to the MR element 12, a signal magnetic field shown by numeral 32 in FIG. 5 is applied to the MR element 12 from the magnetic recording medium, the MR element 12 produces at its output an output signal shown by numeral 33 in FIG. 5 the polarity of which can not be discriminated. Therefore, when the MR element 12 is operated under the state that a predetermined DC biasing magnetic field $\overline{H_B}$ is supplied thereto as shown in FIG. 6 and an input signal magnetic field shown by numeral 34 in FIG. 6 is supplied from the magnetic recording medium, the MR element 12 produces such an output signal shown by numeral 35 in FIG. 6 in which the polarity of the input signal magnetic field can be discriminated.

In particular, this invention provides a means for generating a biasing voltage in order that the potential difference $V_{MR} - V_S$ between the potential $V_{MR}$ of the thin film MR element 12 and the potential $V_S$ of the substrate 14 may always be made less than or equal to 0.2 V or the condition $V_{MR} - V_S \leq 0.2$ V is always satisfied. Further, in the invention the MR element 12 is grounded, and the conductive substrate 14 is grounded substantially through a low impedance.

Figure 7:
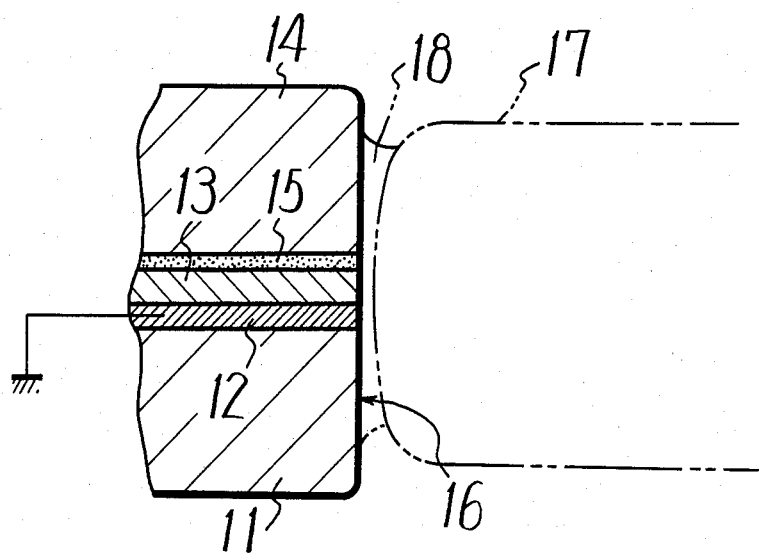
FIG. 7 is an enlarged cross-sectional view of a main part of the magnetic transducer head according to the present invention shown in FIGS. 3 and 4.

FIG. 7 is a further enlarged cross-sectional view of the main part of the MR effect type magnetic transducer head according to the present invention as described above. In FIG. 7, like parts corresponding to those of FIGS. 3 and 4 are marked with the same references, and hence the descriptions thereof will be omitted.

Figure 8:
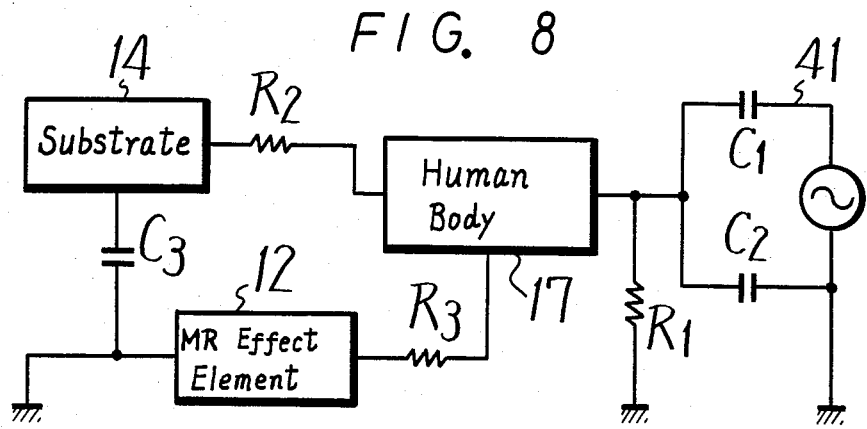
FIGS. 8 and 9 are respectively equivalent circuits thereof.
Figure 9:
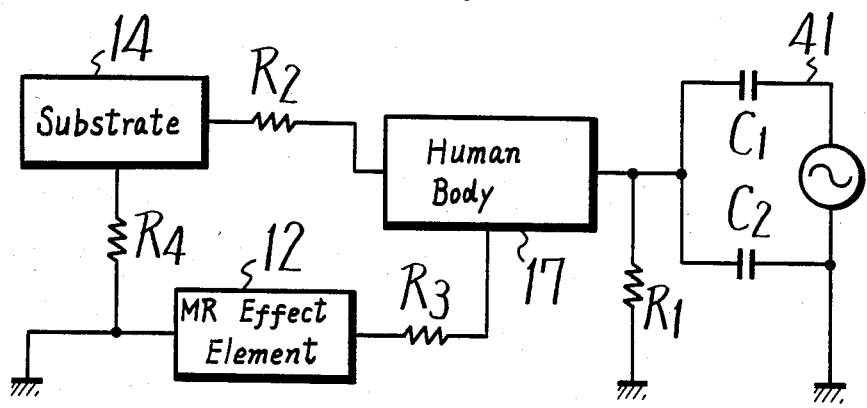

In the figure, a part denoted by numeral 17 and shown by two-dot chain line represents a fingertip of the human body, which is in contact with the contacting surface 16 with the magnetic recording medium. In this case, the human body or fingertip 17 contacts with the parts facing the contacting surface 16 and across both of the substrates 11 and 14 through an electrolyte such as sweat denoted by numeral 18 and shown by a one-dot chain line in the figure to electrically short-circuit the elements on the above parts. Under this state shown in FIG. 7, an equivalent circuit including the human body or fingertip 17 becomes as shown in FIG. 8. In FIG. 8, like references corresponding to those of FIG. 7 identify the same elements and parts. In FIG. 8, characters $C_1$ and $C_2$ designate electrostatic capacities interposed equivalently between the fingertip 17 and a power source line 41, which ordinarily have a capacitance in the range from several pF to several tens pF. Character $R_1$ designates a ground resistance of the human body 17, which normally has the resistance value of several hundreds MΩ. Character $R_2$ designates a contact resistance between the substrate 14 and the human body 17, which normally has the resistance value of several KΩ when the substrate 14 is made of $Al_2O_3$ - TiC described hereinbefore. Moreover, character $R_3$ designates a contact resistance between the MR element 12 and the human body 17, which normally has the resistance value of several MΩ to several tens MΩ. Furthermore, character $C_3$ designates an electrostatic capacity produced between the MR element 12 and the substrate 14, which has the capacitance value of several thousands pF. In this case, while the substrate 14 is floated from the ground potential by way of the capacity $C_3$, since the resistors $R_2$ and $R_3$ are of large values, it is considered that the substrate 14 will substantially be grounded through the capacity $C_3$ without the provision of any external means. However, if necessary, as shown in FIG. 9, the substrate 14 can be grounded by way of an external resistor $R_4$ of low impedance less than several tens KΩ.

As stated above, the magnetic transducer head according to the present invention is constructed such that at least one of the substrates gripping therebetween the MR element 12, for example, the substrate 14 is made to have the conductivity and to be grounded substantially through the low impedance. Accordingly, when the fingertip 17 comes into contact with the contacting surface 16 with the magnetic recording medium as shown in FIG. 7, the human body 17 is inevitably grounded by way of the substrate 14. Thus, for example, at least in the inoperative mode the magnetic transducer head, the MR element 12 and the human body 17 are both made the same potential as the ground potential so that no current is flowed from the MR element 12 to the substrate 14. Therefore, such an accident as to cause the electrolysis in the MR element 12 can be avoided.

Figure 10:
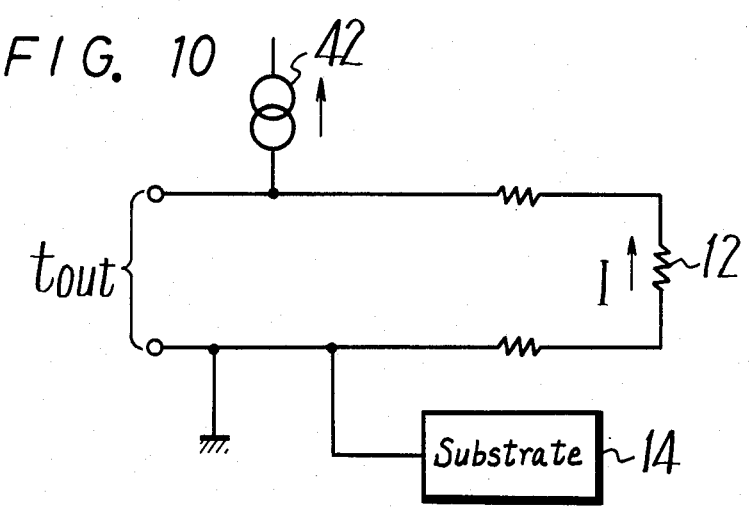
FIGS. 10 to 12 are circuit diagrams each used to apply a biasing voltage to the magnetic transducer head according to the present invention.
Figure 11:
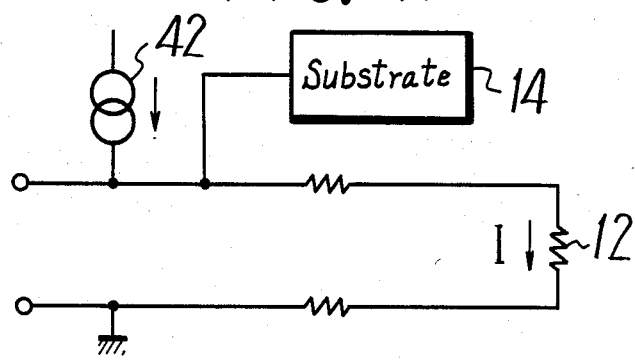
Figure 12:
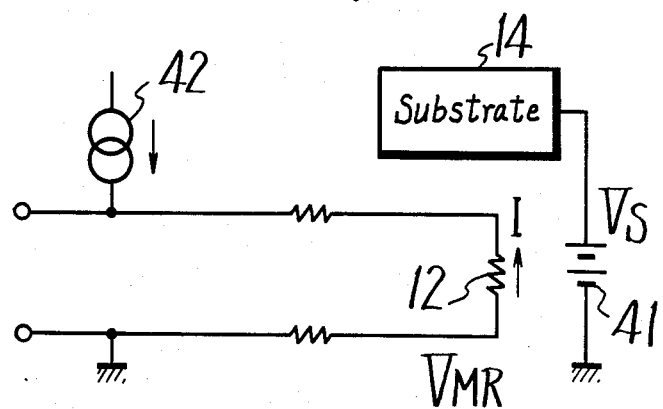

But, even though it is arranged as seen in the above that the human body 17 is grounded through the substrate 14, if in the operation mode of the magnetic transducer head the human body 17 come into contact therewith, as shown in FIG. 7, this may cause sometimes the MR element 12 to be eroded as mentioned before. To be more specific, while in the operation mode of the magnetic transducer head, the current I is flowed through the MR element 12 as mentioned previously and hence the voltage drop is caused by the resistance of the MR element 12. When the potential $V_{MR}$ of the MR element 12 caused by this voltage drop exceeds by +0.2 V for the potential $V_S$ of the substrate 14 and hence the current is flowed from this MR element 12 to the substrate 14, the electrolysis occurs in the MR element 12. To cope with the above aspect, as mentioned before, the present invention provides a biasing means for making the potential difference between the potential $V_{MR}$ of the MR element 12 and the potential $V_S$ of the substrate 14 equal to or less than 0.2 V even in the operation mode of the magnetic transducer head. This biasing means operates such that as, for example, shown in FIGS. 10 and 11, the current I flowing through the MR element 12 makes the voltage of the MR element 12 lower than the voltage of the substrate 14. Or, as shown in FIG. 12, a power source 41 can be provided to supply the higher potential $V_S$ to the substrate 14 than the potential $V_{MR}$ of the MR element 12. In FIGS. 10 to 12, each of numerals 42 denotes a current source for applying the current I to the MR element 12.

As described above, in accordance with the present invention, the MR magnetic transducer head includes the conductive substrate 14 so that when the magnetic transducer head is touched by, for example, the fingertip, the human body is grounded inevitably through the substrate 14. Moreover, even upon the operation mode of the magnetic transducer head, such state is avoided that the current is flowed from the MR element 12 to the substrate 14, and particularly the voltage exceeding 0.2 V causing the electrolysis in the MR element 12 is applied across the MR element 12. Therefore, even upon the operation mode of the magnetic transducer head, it can be avoided that the MR element 12 is eroded.

While in the aforesaid embodiments of the present invention the substrate 14 is formed of the conductive substrate, the substrate 11 can be similarly formed of the conductive substrate. In this case, the MR element 12 must be electrically insulated from the conductive substrate 11. To this end, it is enough that the MR element 12 is formed on the substrate 11 through a thin insulating layer made of $SiO_2$ or the like.

Figure 13:
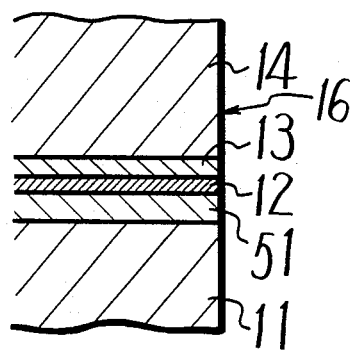
FIG. 13 is an enlarged cross-sectional view of a main part of another embodiment of a magnetic transducer head according to the present invention.

In addition, the present invention can be applied to a magnetic transducer head of a shield type, in which both of the substrates 11 and 14 are made of magnetic materials to enable a magnetic shield effect. In this case, as, for example, shown in FIG. 13, each of the substrates 11 and 14 is made of magnetic material such as Mn - Zn system ferrite having a resistivity of several Ω.cm the substrate 11 is provided thereon with a nonmagnetic insulating layer made of, for example, $Al_2O_3$ layer 51, on which the MR element 12 is formed. Then, the $SiO_2$ insulating layer 13 is completely formed thereon, to which the substrate 14 is further bonded.

Figure 14:
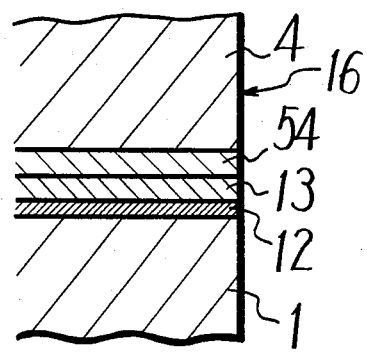
FIG. 14 is an enlarged cross-sectional view of a main part of a magnetic transducer head according to a comparative example for the present invention.

Next, tests for measuring the erosion of the following magnetic transducer heads done by the contact of the fingertip therewith were carried out. In this case, the magnetic transducer heads used are as follows. The conventional MR magnetic transducer head as mentioned before; the magnetic transducer head with the arrangement shown in FIG. 7 according to the present invention (hereinafter, called type A); the magnetic transducer head with the arrangement shown in FIG. 13 according to the present invention (hereinafter, called type B); and a magnetic transducer head prepared as a comparative example as shown in FIG. 14, in which the substrate 1 made of sapphire is formed thereon with the MR element 12, on which the $SiO_2$ insulating layer 13 is formed extensively on which the substrate 4 made of sapphire is further formed by way of Au layer 54 having the thickness of about 5000 Å which is enoughly thinner than the substrates 1 and 4. The results of the tests are shown in the following table 1. In this case, the erosion measurement was carried out in such a way as follows. In order to avoid that the contact state by the fingertip and the state of sweat are scattered, first, the fingertip was dipped into 0.5% NH4Cl aqueous solution and then came into contact with the surface 16 of each of the magnetic transducer heads where each MR element 12 in each of the samples was made of permalloy (Fe - Ni system alloy), which is usually eroded radically by NH4Cl solution. In the following table 1, respective marks O, Δ and × indicate measured results of erosion of the MR element 12 after five-minute contact by the fingertip as follows.

mark O: no change is recognized in the resistance value and also no change is recognized even in the observation by the microscope.

mark Δ: In any one of the resistance value and the observation by the microscope, even a slight change is recognized.

mark ×: The MR element 12 is appreciably eroded.

TABLE 1

| potential of human body | potential of MR element | conventional example | comparative example | type A | type B |
|---|---|---|---|---|---|
| floating | floating | Δ | Δ | O | O |
| | ground | X | X | O | O |
| | negative to the ground | X | X | O | O |
| ground | floating | O | O | O | O |
| | ground | O | O | O | O |
| | negative to the ground | O | O | O | O |
| | positive to the ground 0.1 V | O | O | O | O |
| | positive to the ground 0.2 V | Δ | Δ | O | O |
| | positive to the ground 0.3 V | X | X | X | X |
| | positive to the ground 0.4 V | X | X | X | X |

As will be apparent from the above table 1, in the MR magnetic transducer heads of the invention with the arrangements of types A and B which can satisfy the condition expressed by $V_{MR} - V_S \leq 0.2$ V, the MR element thereof is never eroded.

As stated above, in accordance with the present invention, even when the human body such as the fingertip comes into contact with the MR magnetic transducer head, the MR element thereof can be avoided from being eroded so that the handling thereof becomes easier, the reliability thereof is enhanced, and the life span thereof is extended. This leads to extremely large advantages in practice.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A magnetic transducer head utilizing magnetoresistance effect comprising:
 a thin film magnetoresistance effect element held between first and second substrates, at least one of said first and second substrates being formed of a electrically conductive material, and a biasing means for said magnetoresistance effect element to satisfy a potential relation $V_{MR} - V_S \leq 0.2$ volt, wherein $V_{MR}$ is a potential of said magnetoresistance effect element, and $V_S$ is a potential of said conductive substrate.

2. A magnetic transducer head utilizing magnetoresistance effect according to claim 1, wherein said first substrate is made of sapphire.

3. A magnetic transducer head utilizing magnetoresistance effect according to claim 1, wherein said second substrate is made of sintered complex of alumina and titanium carbide, and said magnetoresistance effect element and said second substrate is insulated by an insulating layer.

4. A magnetic transducer head utilizing magnetoresistance effect according to claim 1, wherein said first and second substrates are made of electrically conductive magnetic ferrite, and said magnetoresistance effect element is insulated by insulating layers.

5. A magnetic transducer head utilizing magnetoresistance effect according to claim 1, wherein said biasing means is a current source to provide a current flow along a direction to satisfy said relation through said magnetoresistance effect element.

* * * * *